United States Patent [19]

Kato et al.

[11] Patent Number: 5,658,795
[45] Date of Patent: Aug. 19, 1997

US005658795A

[54] METHOD FOR BIODEGRADATION OF POLLUTING SUBSTANCE

[75] Inventors: Kinya Kato; Kazumi Tanaka, both of Yokohama; Masanori Sakuranaga, Atsugi; Shinya Kozaki, Kawasaki, all of Japan

[73] Assignee: Canon Kabushiki Kaisha, Tokyo, Japan

[21] Appl. No.: 571,739

[22] Filed: Dec. 13, 1995

Related U.S. Application Data

[63] Continuation of Ser. No. 142,068, Oct. 20, 1993, abandoned.

[30] Foreign Application Priority Data

Oct. 20, 1992 [JP] Japan ................................. 4-281987

[51] Int. Cl.$^6$ ................ C12N 1/20; C07C 61/00
[52] U.S. Cl. ................ 435/262.5; 435/267; 435/262
[58] Field of Search ................ 435/262, 262.5, 435/267

[56] References Cited

U.S. PATENT DOCUMENTS

| | | | |
|---|---|---|---|
| 4,508,824 | 4/1985 | Olsen | 435/253 |
| 4,530,763 | 7/1985 | Clyde et al. | 210/610 |
| 4,871,673 | 10/1989 | Rehm et al. | 435/262 |
| 5,242,825 | 9/1993 | Mueller | 435/262.5 |

FOREIGN PATENT DOCUMENTS 9119039  12/1991  WIPO ..................... 435/262

OTHER PUBLICATIONS

Finette et al., "Isolation and Characterization of Pseudomonas Putida ... ", 1984, J. Bacter., vol. 160, p. 1003-9.
Wackett et al., "Degradation of Trichloroethylene by Toluene ... ", 1988, App. Env. Microbial., vol. 54, pp. 1703-1708.
Crueger et al. *Biotechnology: Textbook of Industrial Microbiology* pp. 131-139, Science Tech, Madison, 1982.
APS Japanese Patent Office Abstract 03-251178 Svemitsu, R. Nov. 8, 1991.

*Primary Examiner*—Carolyn Paden
*Attorney, Agent, or Firm*—Fitzpatrick, Cella, Harper & Scinto

[57] ABSTRACT

A method of biodegradation of a polluting substance by a microorganism is disclosed, wherein the microorganism is an auxotrophic microorganism and the action of the auxotrophic microorganism is controlled by the amount of a required nutrient for the auxotrophic microorganism. A carrier for supporting an auxotrophic microorganism for use for biodegradation contains a required nutrient for the auxotrophic microorganism.

24 Claims, 11 Drawing Sheets

METHOD FOR BIODEGRADATION OF POLLUTING SUBSTANCE

This application is a continuation of application Ser. No. 08/142,068 filed Oct. 20, 1993, now abandoned.

BACKGROUND OF THE INVENTION

1. Field of the Invention

The present invention relates to a method of biodegradation of a polluting substance, which method employs an auxotrophic microorganism and is useful for environment protection.

2. Related Background Art

In recent years, various harmful and non-decomposable chemical substances have come to be detected in soil, river, sea, air and other environments, and the environmental pollution has become highlighted. The adverse effects given by such substances are become a matter of great concern. Therefore, prevention of pollution and remediation of the environment from pollution are strongly demanded. An example of environment remediation technique is a strengthening of functions of microorganisms in the ecosystem to decompose the polluting substances into non-polluting substances. This technique intends to stimulate the natural degradation processes, to promote the decomposition of the polluting substance. This technique is further advanced to introduce intentionally from the outside a microorganism having an ability of decompose a polluting substance to promote remediation of a polluted area to a non-polluted state. Biodegradative clean-up technology is demanded in various fields such as treatment of polluted soil in gas production plant sites, oil refinery plant sites, sites of a demolished petroleum refinery, sites of a demolished fuel stockyard, sites of a demolished pulp plant; cleaning of lakes and marshes, rivers, sea water, underground water, and the like; treatment of drinking water and industrial water; treatment of industrial waste water and living waste water; and so forth. Pollution of soil may cause spread of the polluted area by diffusion of the polluting substance with underground water, and pollution of river or the like may cause spread of the polluting substance with flow of water over the basin or the shore. Therefore, an effective method for removal of polluting substance from soil and water is strongly demanded.

Although various physical and chemical methods are known for removal of polluting substances, few of the methods are satisfactory from a standpoint of cost, ease of operation, and decomposition efficiency. For soil treatment, for example, a vacuum extraction method is available which sucks out the polluting substance from the soil. This method; however, is unsatisfactory in view of the cost, ease of the operation, and the efficiency of elimination of the polluting substance.

Therefore, a biodegradation method is attracting attention to offset the disadvantages of the physical and chemical methods.

However, if a microorganism for biodegradation is applied in a high concentration to soil or river, the ecosystem in the applied area will be changed. Such change of ecosystem is not favorable for environmental protection. The ecosystem in the treated area should desirably be restored to the original state when the polluting substance has been removed or decomposed. Furthermore, if the microorganism diffuses out unnecessarily from the polluted area during the biodegradation, the diffused microorganism itself may possibly cause secondary pollution or other hazard. Ideally, the microorganism introduced from the outside should work only in the polluted area, and become extinct spontaneously after the environment is remediated. In particular, in use of a microorganism in open systems such as soil, lake, marsh, river and sea, the fate of the microorganism is a great problem.

SUMMARY OF THE INVENTION

The present invention intends to provide a method of biodegradation of a polluting substance, where an applied microorganism works only in a polluted area and becomes extinct spontaneously after the remediation of the pollution so as to avert the effect of the remaining microorganism on the ecosystem.

The present invention provides a method of biodegradation of a polluting substance by a microorganism, the microorganism being an auxotrophic microorganism and the action of the auxotrophic microorganism being controlled by the amount of a required nutrient for the auxotrophic microorganism.

The present invention also provides a carrier for supporting an auxotrophic microorganism for use for biodegradation, the carrier containing a required nutrient for the auxotrophic microorganism.

DESCRIPTION OF THE PREFERRED EMBODIMENT

Figure 1:
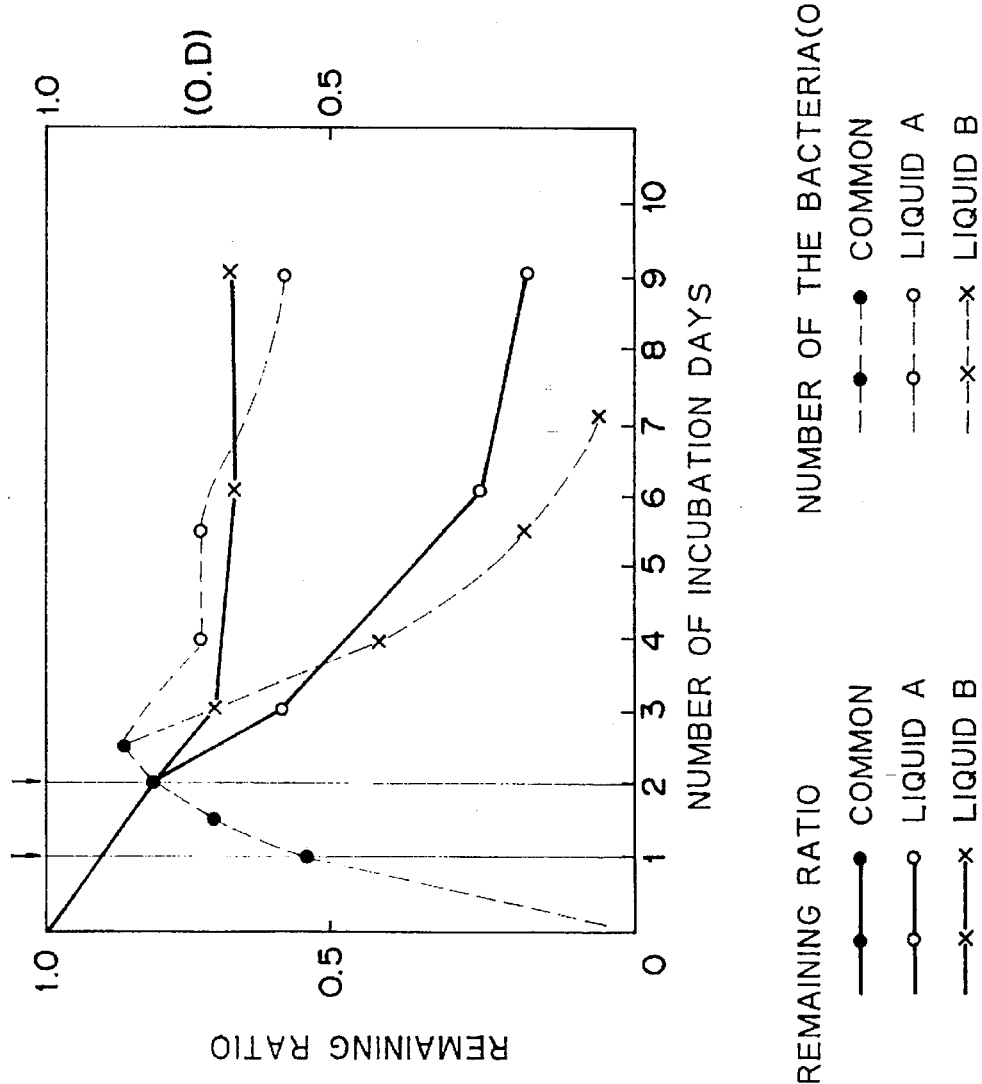
FIG. 1 is a graph showing the results obtained in Example 1.

The inventors of the present invention noticed the application of an auxotrophic microorganism to remediation of an ecosystem as described above. The inventors found that when found the applied auxotrophic microorganism is allowed to work only in the polluted area or the area where the microorganism is made to work, then the microorganism becomes extinct spontaneously after the remediation of the pollution. This result is obtained when the action of the auxotrophic microorganism is controlled by adjusting an amount of the substance required by the auxotrophic microorganism (hereinafter referred to as a "required nutrient"). Thus the present invention has been completed.

A microorganism, which has lost a metabolic system or biosynthetic system of a certain nutrient, is incapable of producing the nutrient in the cell of the microorganism, and requires a supply from the outside of the nutrient necessary for living and multiplying. Examples of such required nutrients include amino acids, nucleic acid bases, vitamins, organic acids, and other growth factors. Without the supply of the required nutrient, the microorganism will become extinct. If such an auxotrophic microorganism is employed for environment remediation, the microorganism will survive in the area during the time when the activity of the microorganism is needed as long as the required nutrient coexists. The diffusion or growth of the microorganism will be stopped either by limiting the supply of the required nutrient to a specific area or by limiting the time the nutrient is supplied.

The method of the present invention is applicable generally to any kind of microorganism. The kind of the microorganism to be employed may be suitably selected in accordance with the properties of the chemical substance to be decomposed and removed. For example, Pseudomonas sp., Acinetobacter sp., Metyiosinus sp., and the like which exhibit activities of pollutant-decomposition are suitable for removal of dyes having an aromatic ring or furan structure, pigments, surfactants, surface-coating agents, adhesives, organic solvents, petroleum type pollutants, etc.

The kind of the auxotrophic microorganism is not particularly limited, and those which require a nutrient such as an amino acid (e.g., leucine, tryptophane, histidine, arginine, etc.), a nucleic acid base(e.g. thymine), a vitamin, an organic acid, or the like are useful. It is desirable that the kind of the auxotrophic microorganism is selected so as to meet suitably the conditions of the environment. Such an auxotrophic microorganism can be derived by subjecting a microorganism to ultraviolet light irradiation, chemical treatment with nitrosoguanidine, or the like treatment in a conventional manner. For example, methods of the treatment are described in the book: "Biseibutsu Jikkengaku (Experiment in microbiology)" pp. 288–306, (Kodansha Scientific K.K.). The nutrient may be in any state of a liquid, a solid, a fluid, or the like provided that it is readily usable to the auxotrophic microorganism.

The auxotrophic microorganism is usually applied to the polluted environment in a form of a bacterial mass in a conventional manner. The treatment with the applied microorganism may be conducted in the co-existence of a carrier for the microorganism. Herein the co-existence includes the cases: (a) the carrier is supplied to the polluted environment separately before or after the application of the microorganism, and (b) the microorganism to be applied is preliminarily fixed on the carrier.

In the case of (b), the microorganism may be fixed by a conventional immobilization method: including solid bonding (physical adsorption, ionic adsorption, covalent bonding, etc.) in which the microorganism is directly or indirectly bonded to the surface of an organic or inorganic water-insoluble carrier such as cellulose, nylon, and ceramic; bridging by a compound having two or more functional groups such as glutaraldehyde, and toluene diisocyanate; embedding in which the microorganism is embedded in a polymer such as calcium alginate, carrageenan, and photo-setting resins; and the like methods (see "Koteika Seitai Shokubai (Immobilized Biocatalyst) pp. 67–81 (Kodansha Scientific K.K.).

In treatment of a liquid where diffusion of the microorganism into the liquid medium is required to be prevented, a fixing method is suitably selected which bonds the microorganism strongly to the carrier. In this case, strong fixation will not cause a problem, since mass transfer in liquid medium usually proceeds relatively readily.

In treatment of soil, relatively loose fixation of microorganism to the carrier is required so that the microorganism may readily come off and migrate into the soil to come to contact with the polluting substance effectively with the sufficient number of microorganism being retained by the carrier. In this case, the carrier and fixation state of the microorganism are selected so as to obtain a relatively loose fixation state.

In the treatment of a polluted area of natural environment, frequently the applied microorganism cannot function effectively owing to competition with other microorganisms living already in the natural ecosystem or predation of the applied microorganism by protists or the like. Otherwise the applied microorganism cannot frequently be predominant because of the oligotrophic conditions of the environment to be treated.

Therefore against the severe external environment, the microorganism may be protected by using a carrier having pores of several µm diameter and suitable depth and forming microhabitat of the microorganism in the pore. For example, even if the outside of the pore is in a dry state that adversely affects viability of the microorganism, the microorganism can survive owing to the capillary water retained in the microhabitat. Even when a salt concentration suddenly changes outside the pores, the influence of the change is weakened by the buffering effect, given by the distance between the microhabitat and the external environment, thereby protecting the microorganism in the microhabitat.

Further, invasion and extermination of the applied microorganism by a native microorganism can be prevented by formation of a predominating region of the applied microorganism in the microhabitat. If the inside diameter of the pore of the microhabitat is formed to have a diameter of less than about 10 µm, the invasion and predation by protists can be prevented.

By formation of such microhabitat for the microorganism in the pore of the carrier before application to the soil, the microorganism in the pore can survive or grow protected from other native microorganism in the soil or the soil environment. The microorganism will be maintained for a longer period than the microorganism directly applied to the soil. The microorganism is released from the pore into the soil and it decomposes the polluting substance in the soil.

The carrier may be in any shape provided that it has pores for formation of microhabitat for the microorganism to be applied. The diameter of the carrier is preferably in the range of from several hundred µm to several mm to facilitate the migration or dispersion of the carrier in the soil.

The material for constructing the carrier includes inorganic materials such as charcoal, porous ceramics, porous glass, calcium silicate, silica, kaolinite, and montmorillonite; soil materials having aggregate structure such as Kanuma soil; active carbon; and organic materials such as urethane foams and anion-exchange resins.

By use of a biodegradable material for formation of the carrier, problems are eliminated regarding secondary pollution caused by remaining carrier and damage of the ecosystem caused by the applied microorganism. A biodegradable carrier is preferred which is degraded gradually to remove the microhabitat after the remediation treatment by the applied microorganism. By use of such a carrier, for example, in soil treatment, the applied microorganism is released into the soil as the result of disappearance of the microhabitat, and decreases in number and finally becomes extinct owing to competition with native microorganisms, predation by protist, and severe conditions for growth. Thus, the ecosystem in the soil being restored to the original state. Such effects may be expected also in liquid treatment.

The material for such biodegradable carriers includes cellulose, lignin, starch, agarose, dextran, albumin, chitin, chitosan, filter paper, wood pieces, and so forth. The carrier made of such a material is preferred since it fixes the microorganism relatively loosely, releases the grown microorganism relatively readily, is inexpensive, and in some cases, becomes a nutrient for the applied microorganism itself.

The rate of degradation of the biodegradable carrier itself may be controlled by selecting the kind and properties of the constituting material. For example, the diameter and shape of the pores, the size and shape of the carrier, and so forth are suitably selected in consideration of the material. In selecting the above requirements, the factors to be considered in connection with the degradation rate include the kind, the amount and carrier-degradation activity of the microorganism, and the volume of the treated soil. The carrier is preferably designed after confirming decomposition of the polluting substance, and degradation of the carrier by field experiments.

The carrier contains preferably the required nutrient because the contact of the applied microorganism with the required nutrient is facilitated thereby and the control of the applied microorganism is also readily conducted by control of the required nutrient. Further, the working period of the applied microorganism and the remaining period of the carrier can be controlled by employing at least one required nutrient as the constituent of the carrier in a controlled amount to cause degradation of the carrier by consumption of the required nutrient by the applied microorganism. In this case also, it is more desirable to make the entire carrier biodegradable from the standpoint of environmental protection.

For treatment of a liquid, one example of a preferred type of carrier has a required nutrient fixed thereon and has an applied microorganism fixed such that the microorganism is not excessively readily released into the liquid. This type of carrier which contains the required nutrient facilitates the contact of the microorganism with the nutrient and makes the supply of the nutrient efficient. Furthermore, the microorganism does not diffuse into the environment since both the required nutrient and the applied microorganism are fixed on the carrier. With this type of carrier, an auxotrophic microorganism diffusing into the environment dies from the lack of the required nutrient. This is suitable for the case where diffusion of the applied microorganism causes a problem, and the release of the required nutrient to the environment is suppressed.

In treatment of soil where mass transfer is slow, the treatment is made more effective by the constitution which releases the applied microorganism and the required nutrient fixed on the carrier into the peripheral space. In an example, the carrier for forming a microhabitat contains at least one required nutrient as a constituent, and the carrier is gradually collapsed as the nutrient is consumed by the applied microorganism, resulting finally in collapse of the microhabitat as the result of degradation of the carrier and leading to extinction of the applied microorganism. This is suitable in the case where the remaining applied microorganism in the soil causes a problem.

EXAMPLES

In Examples, M9 culture medium employed in the following examples has the composition below.

M9 Culture Medium Composition (per liter):

| | |
|---|---|
| $NaH_2PO_4$ | 6.2 g |
| $KH_2PO_4$ | 3.0 g |
| NaCl | 0.5 g |
| $NH_4Cl$ | 1.0 g |
| (pH 7.0) | |

The change of the number of bacteria was estimated from the change of the light absorbance (O. D.)

Example 1

(Growth of Auxotrophic Microorganism with Required Nutrient, Decomposition of Polluting Substance Thereby, and Fate of Microorganism in Absence of Required Nutrient)

A leucine-requiring mutant was obtained by ultraviolet light irradiation from Pseudomonas cepacia KK01 strain which is a novel bacteria strain having an ability of decomposing a phenolic compound such as phenol, o-cresol, m-cresol, and p-cresol, and was deposited in Fermentation Research Institute of Agency of Industrial Science and Technology of MITI of Japan on Mar. 11, 1992 having a depository address of 1-3, Higashi 1-chome, Tsukuba-shi, Ibaraki-ken, 305, Japan, and converted to international deposition on Mar. 9, 1993 under Budapest Agreement (Deposit No.: FERM BP-4235). The isolated strain is the same as a KK01 strain (International Deposition No. FERM BP-4235) that was deposited as a novel strain having the power to degrade phenolic compounds such as phenol, o-cresol, m-cresol and p-cresol in Fermentation Research Institute, Agency of Industrial Science and Technology, Ministry of International Trade and Industry on Mar. 11, 1992 and then changed to the international deposition in accordance with the Budapest treaty on Mar. 9, 1993.

A. Morphological Properties (1) Gram stain: Negative (2) Size and shape of the bacteria: Bacillus having a length of 1.0–2.0 μm and a width of about 0.5 μm.

(3) Mobility: Present

B. Growth state of the bacteria in each culture medium

| Culture Medium | Culture Temp. (°C.) | Growth State |
|---|---|---|
| Blood agar culture medium | 37 | + |
| Lactose agar culture medium | 37 | + |
| Chocolate agar culture medium | 37 | ++ |
| GMA | 37 | − |
| Scyllo | 37 | — |
| Usual agar culture medium | 4 | − |
| Usual agar culture medium | 25 | ± |
| Usual agar culture medium | 37 | − |
| Usual agar culture medium | 41 | ± |

C. Physiological properties (1) Aerobic or anaerobic: Strictly aerobic (2) Degradation type of saccharose: Oxidation type (3) Production of oxidase: +

(4) Reduction of silver nitrate: +

(5) Production of hydrogen sulfide: −

(6) Production of indole: −

(7) Production of urease: −

(8) Liquefaction of gelatin: −

(9) Hydrolysis of arginine: −

(10) Decarboxylation of lysine: +
(11) Decarboxylation of ornithine:
(12) Utilization of citric acid: +
(13) Methylcarbinolacetyl reaction (VP reaction): −
(14) Detection of tryptophane deaminase: −
(15) ONPG: −
(16) Utilization of carbohydrates:
  Glucose: +
  Fruit sugar: +
  Maltose: +
  Galactose: +
  Xylose: +
  Mannitol: ±
  White sugar: −
  Lactose: +
  Aesculin: −
  Inositol: −
  Sorbitol: −
  Rhamnose: −
  Melibiose: −
  Amygdalin: −
  L-(+)-arabinose: +This mutant was inoculated on 5 ml of a culture medium (M9 culture medium, additionally containing 0.05% of yeast extract, 20 µg/ml of leucine, and 500 ppm of phenol), and incubated at 30° C. When the culture came to exhibit the value of O.D. of 0.7, the incubated culture was transferred to 500 ml of another culture medium (M9 culture medium containing 0.05% of yeast extract and 500 ppm of phenol), and incubation was continued. The required nutrient, leucine, was supplied in 10 ml (20 µg/ml) to the culture at an interval of 24 hours as shown in FIG. 1 by arrow marks, and the daily changes of the number of bacteria and the phenol concentration were estimated by light absorbance. After 48 hours, the liquid culture was divided into two equal parts, A and B. The liquid culture A was incubated with supply of leucine in the same manner as before, while the liquid culture B was incubated without supply of leucine. The changes of number of the bacteria and the phenol concentration were measured every 24 hours. FIG. 1 shows the results.

Example 2

(Bacterial Decomposition where the Required Nutrient is fixed in Carrier)

The leucine-requiring mutant obtained from KK01 in Example 1 and having phenol-decomposition ability was inoculated on 5 ml of a culture medium (M9 culture medium, additionally containing 0.05% of yeast extract, 20 µg/ml of leucine, and 500 ppm of phenol), and the culture was incubated at 30° C. When the culture came to exhibit the value of O.D. of 0.7, the liquid culture was further incubated in a 500 ml scale until the O.D. value exceeded 0.7. The liquid culture was centrifuged lightly, and the accumulated bacterial mass was suspended in 20 ml of a culture medium (M9 additionally containing 20 µg/ml of leucine). To the liquid suspension, was added 24 ml of an aqueous solution of 7.5 g of acrylamide monomer and 400 mg of N,N'-methylene-bis(acrylamide) as a crosslinking agent, and the mixture was agitated. To the liquid mixture, were added 1 ml of 25% β-dimethylaminopropionitrile as a polymerization accelerator and 5 ml of 1% $K_2S_2O_8$ as a polymerization initiator at 8° C. The mixture was agitated well and kept at 20° C. to obtain a mutant-fixed carrier.

Figure 2:
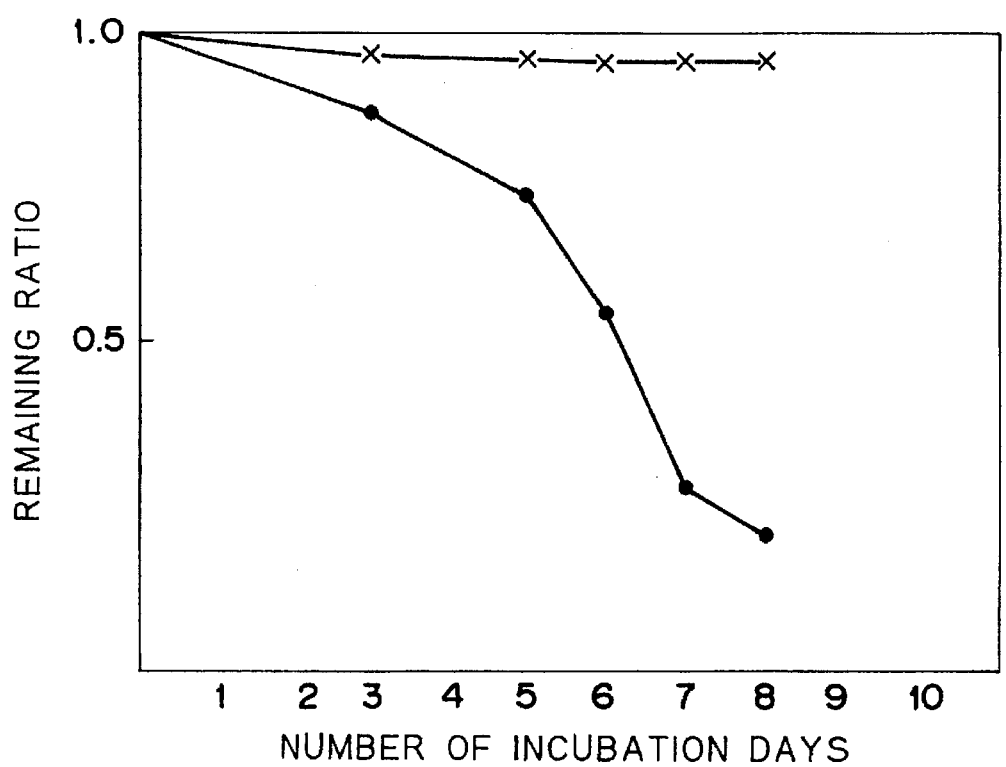
FIG. 2 is a graph showing the results obtained in Example 2 and Comparative Example 1.

The obtained mutant-fixed carrier was crushed and dispersed in 500 ml of an aqueous 250-ppm phenol solution, and the dispersion was incubated by standing at 25° C. The change of the remaining ratio of the phenol in the aqueous solution was determined by HPLC. FIG. 2 shows the results.

Comparative Example 1

(Bacterial Decomposition without Required Nutrient Fixed on Carrier)

The leucine-requiring mutant obtained from KK01 in Example 1 and having phenol-decomposition ability was inoculated on 5 ml of a culture medium (M9 culture medium, additionally containing 0.05% of yeast extract, 20 µg/ml of leucine, and 500 ppm of phenol), and the culture was incubated at 30° C. When the culture came to exhibit the value of O.D. of 0.7, the liquid culture was further incubated in a 500 ml scale until the O.D. value exceeded 0.7. The liquid culture was centrifuged lightly, and the accumulated bacterial mass was suspended in 20 ml of an M9 culture medium. To the liquid suspension, was added 24 ml of an aqueous solution of 7.5 g of acrylamide monomer and 400 mg of N,N'-methylene-bis(acrylamide) as a crosslinking agent, and mixed. To the liquid mixture, were added 1 ml of 25% β-dimethylaminopropionitrile as a polymerization accelerator and 5 ml of 1% $K_2S_2O_8$ as a polymerization initiator at 8° C. The mixture was agitated well and kept at 20° C. to obtain a mutant-fixed carrier.

The obtained mutant-fixed carrier was pulverized and dispersed in 500 ml of an aqueous 250-ppm phenol solution, and the dispersion was incubated by standing at 25° C. The change of the remaining ratio of the phenol in the aqueous solution with lapse of days was determined by HPLC. FIG. 2 shows the results.

Example 3

Figure 3:
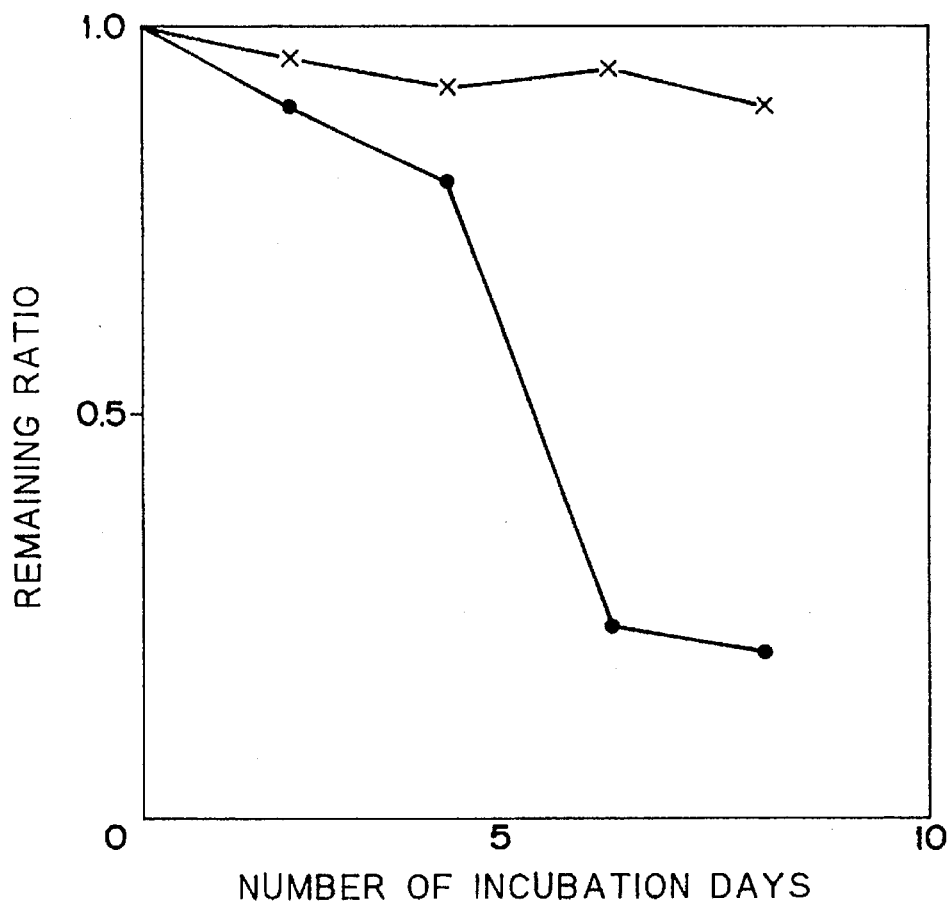
FIG. 3 is a graph showing the results obtained in Example 3 and Comparative Example 2.

The leucine-requiring mutant obtained from KK01 in Example 1 and having phenol-decomposition ability was inoculated on 5 ml of a culture medium (M9 culture medium, additionally containing 0.05% of yeast extract, 20 µg/ml of leucine, and 500 ppm of phenol), and the culture was incubated at 30° C. When the culture came to exhibit the value of O.D. of 0.7, the liquid culture was added to 500 ml of a culture medium (M9 culture medium, additionally containing 0.05% of yeast extract, and 500 ppm of phenol) and was further incubated until the O.D. value exceeded 0.7. In this incubation, about 50 g in total of 3-mm cubic polyurethane pieces were added and agitated for the purpose of promoting the growth of the microorganism. The required nutrient, leucine, was supplied by 25 ml (20 µg/ml) every 12 hours. The change of the remaining ratio of the phenol in the aqueous solution with lapse of days was determined by HPLC. FIG. 3 shows the results.

Comparative Example 2

The mutant was incubated in the same manner as in Example 3 except that leucine was not supplied during the incubation in 500 ml culture medium. The daily change of the phenol-remaining ratio was measured. The results are shown in FIG. 3.

Example 4

(Growth of Auxotrophic Bacteria with Addition of Required Nutrient)

The Leucine-requiring mutant of *Pseudomonas cepacia* KK01 from Example 1 was inoculated on 5 ml of a liquid culture (M9 culture medium, additionally containing 0.05% yeast extract and 20 µg/ml of leucine), and the culture was incubated at 20° C. until the O.D. of the culture exceeded 0.7. Then the liquid culture was increased up to 500 ml, and the culture was further incubated until the O.D. exceeded 0.7. The liquid culture was centrifuged lightly, and the accumulated bacterial mass was dispersed in 500 g of sterilized test soil. This test soil was incubated by standing at 25° C. The required leucine was supplied by 50 ml (20 µg/ml) every 24 hours.

Figure 4:
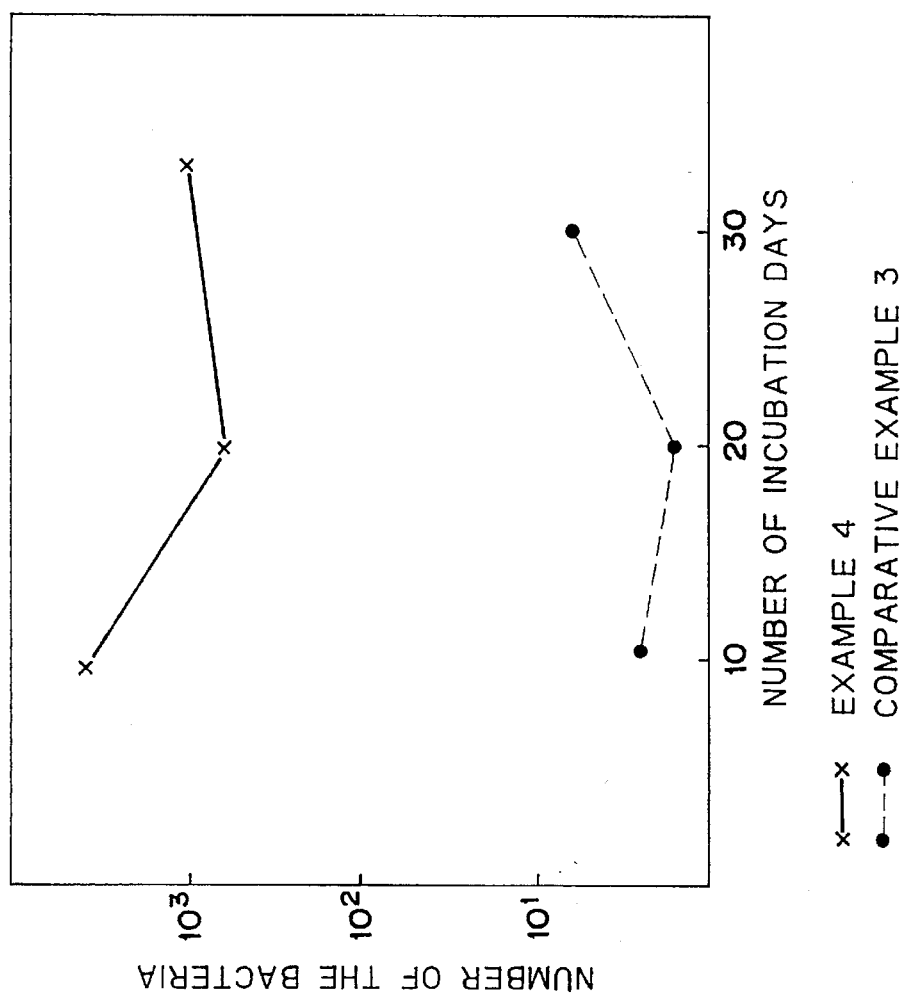
FIG. 4 is a graph showing the results obtained in Example 4 and Comparative Example 3.

The above experiment was conducted in five series: Run 1 to Run 5. 10 g of soil sample was taken from each test soil of the Runs. The number of the bacteria of each soil was estimated by plate dilution culture. The average of the estimated numbers of bacteria was defined as the number of the bacteria. The change of the number of the bacteria with lapse of time was estimated. FIG. 4 shows the results.

Comparative Example 3

(Absence of Required Nutrient)

The change in the number of the bacteria was measured in the same manner as in Example 4 except that leucine was not supplied to the test soil. FIG. 4 shows the results.

Example 5

(Required Nutrient Being Incorporated in Carrier Capable of Forming Microhabitat)

The Leucine-requiring mutant of *Pseudomonas cepacia* KK01 Example 1 was inoculated on 5 ml of a liquid culture (M9 culture medium, additionally containing 0.05% yeast extract and 20 µg/ml of leucine), and the culture was incubated at 30° C. until the O.D. of the culture exceeded 0.7. Then the liquid culture was increased up to 500 ml, and the culture was further incubated until the O.D. exceeded 0.7. The liquid culture was centrifuged lightly, and the accumulated bacterial mass was dispersed in 500 g of sterilized test soil. Thereto filter paper which had been impregnated with an aqueous leucine solution (80 µg/ml) and crushed into pieces of 3 mm or smaller was added in a total weight of about 50 g, and the mixture was blended and incubated by standing at 25° C.

Figure 5:
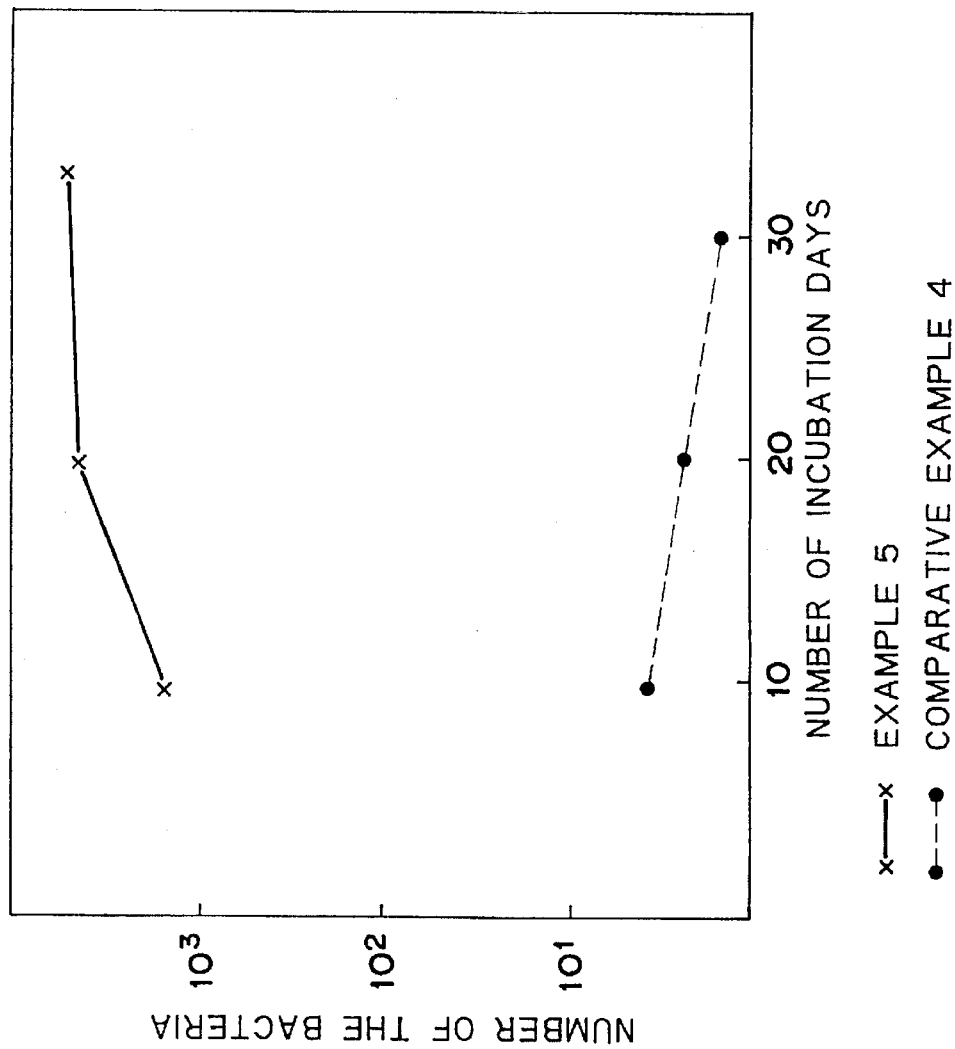
FIG. 5 is a graph showing the results obtained in Example 5 and Comparative Example 4.

The daily change of the number of the bacteria in the soil was estimated in the same manner as in Example 1. FIG. 5 shows the results.

Comparative Example 4

(No Required Nutrient Being Incorporated in Carrier Capable of Forming Microhabitat)

The incubation of the soil was conducted in the same manner as in Example 5 except that the filter paper was not impregnated with the aqueous leucine solution, and the daily change of the number of the bacteria in the soil was estimated. FIG. 5 shows the results.

Example 6

(Bacterial Decomposition with Microhabitat Formed from Required Nutrient)

The leucine-requiring mutant obtained in Example 1 was inoculated on 5 ml of a culture medium (M9 culture medium, additionally containing 0.05% of yeast extract, 20 µg/ml of leucine, and 500 ppm of phenol), and the culture was incubated at 30° C. When the culture came to exhibit the value of O.D. of 0.7, the liquid culture was further incubated in a 500 ml scale until the O.D. value exceeded 0.7. The liquid culture was centrifuged lightly, and the accumulated bacterial mass was dispersed in 500 g of sterilized test soil in which 80 ml of an aqueous 250 ppm phenol solution had been diffused. Thereto filter paper which had been impregnated with an aqueous leucine solution (80 µg/ml) and crushed into pieces of 3 mm or smaller was added in a total weight of about 50 g, and the mixture was blended and incubated by standing at 25° C.

Figure 6:
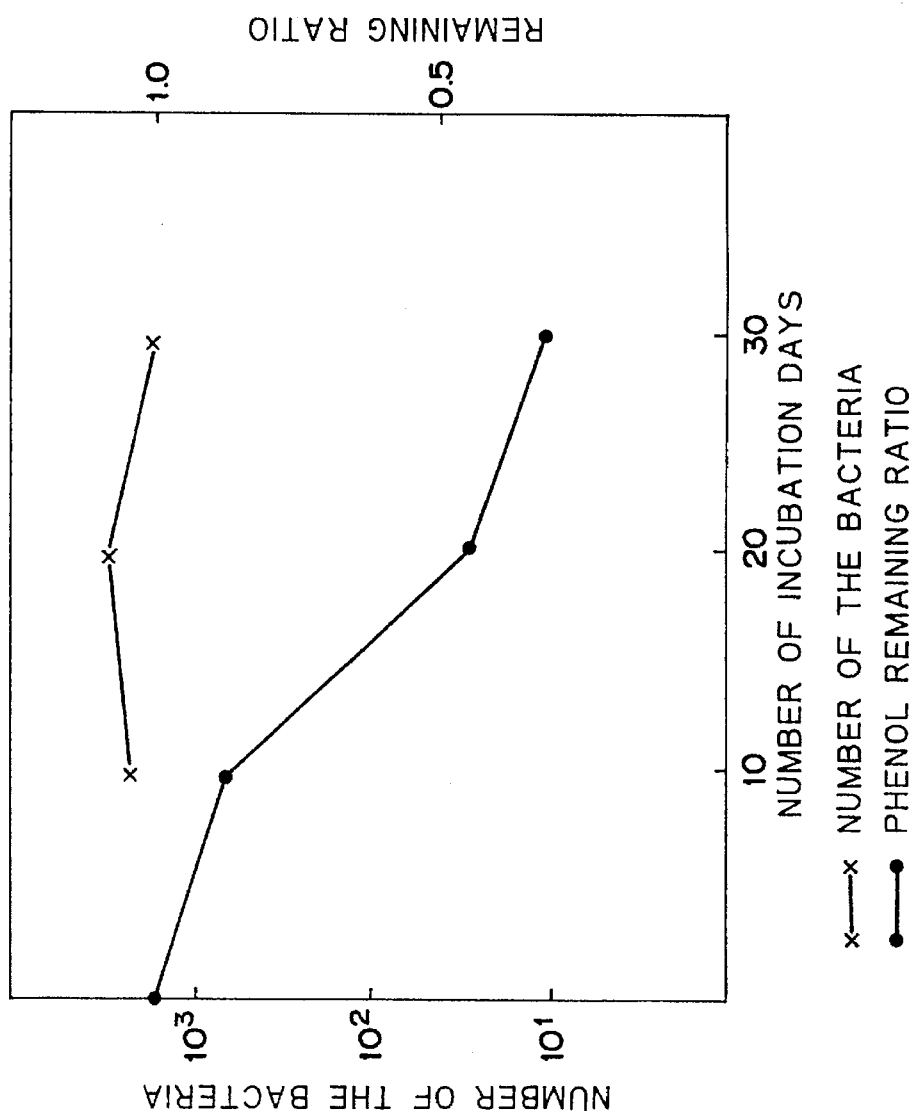
FIG. 6 is a graph showing the results obtained in Example 6.

The daily changes in the number of the bacteria and of the phenol remaining ratio were estimated in the same manner as in Example 4. The phenol in the soil was determined by HPLC. FIG. 6 shows the results.

Comparative Example 5

(Bacterial Decomposition with Microhabitat Formed without Required Nutrient)

Figure 7:
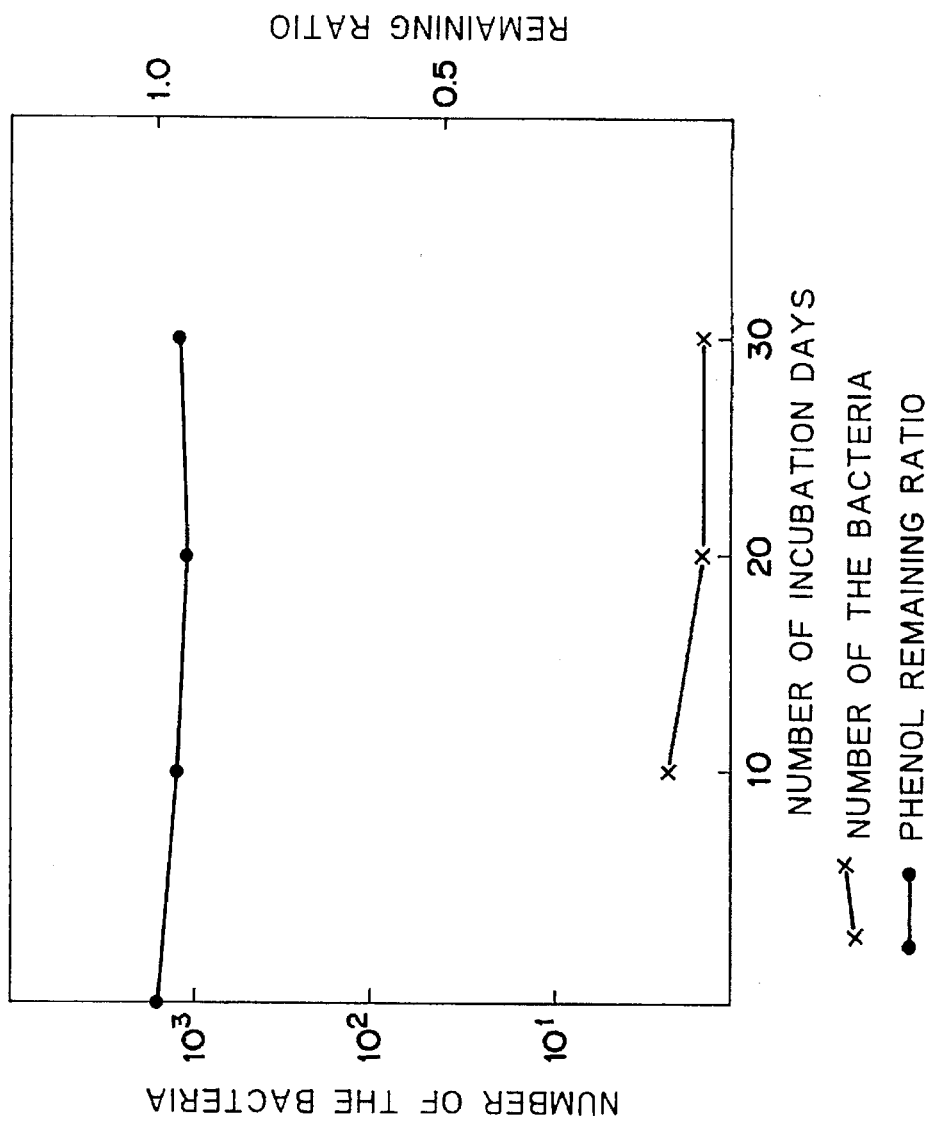
FIG. 7 is a graph showing the results obtained in Comparative Example 5.

The incubation of the soil was conducted in the same manner as in Example 6 except that the filter paper was not impregnated with the aqueous leucine solution, and the daily change of the number of the bacteria in the soil was estimated. FIG. 7 shows the results.

Example 7

(Bacterial Decomposition within Polluted Area Only)

Figure 8:
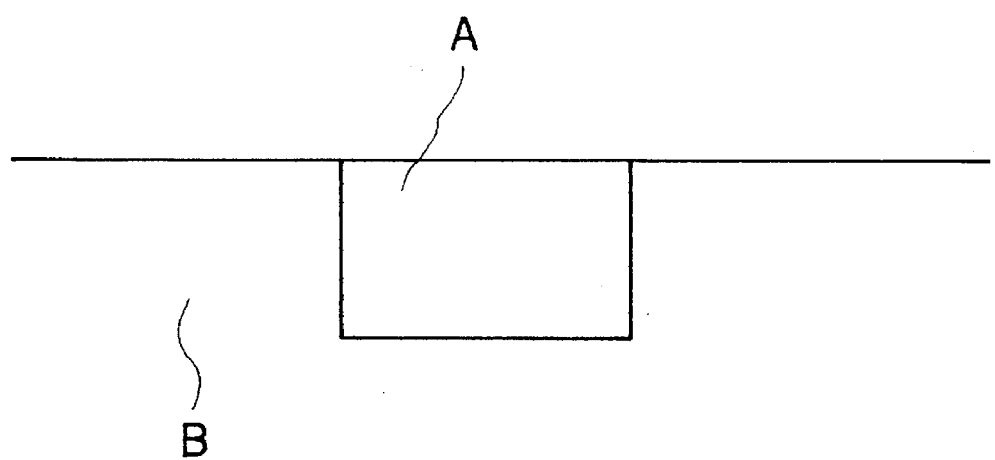
FIG. 8 illustrates a state of the layer of the soil in Example 7.
Figure 9:
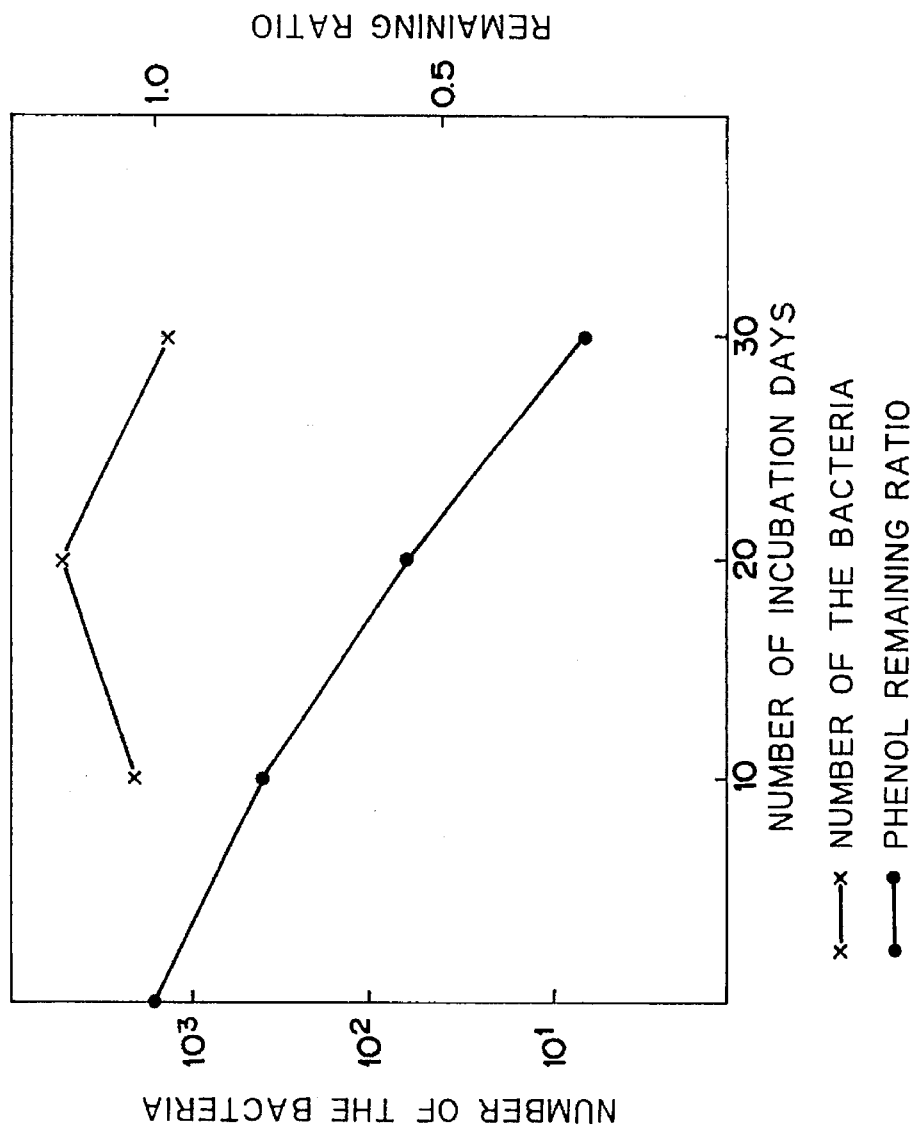
FIG. 9 is a graph showing the results obtained in Example 7.
Figure 10:
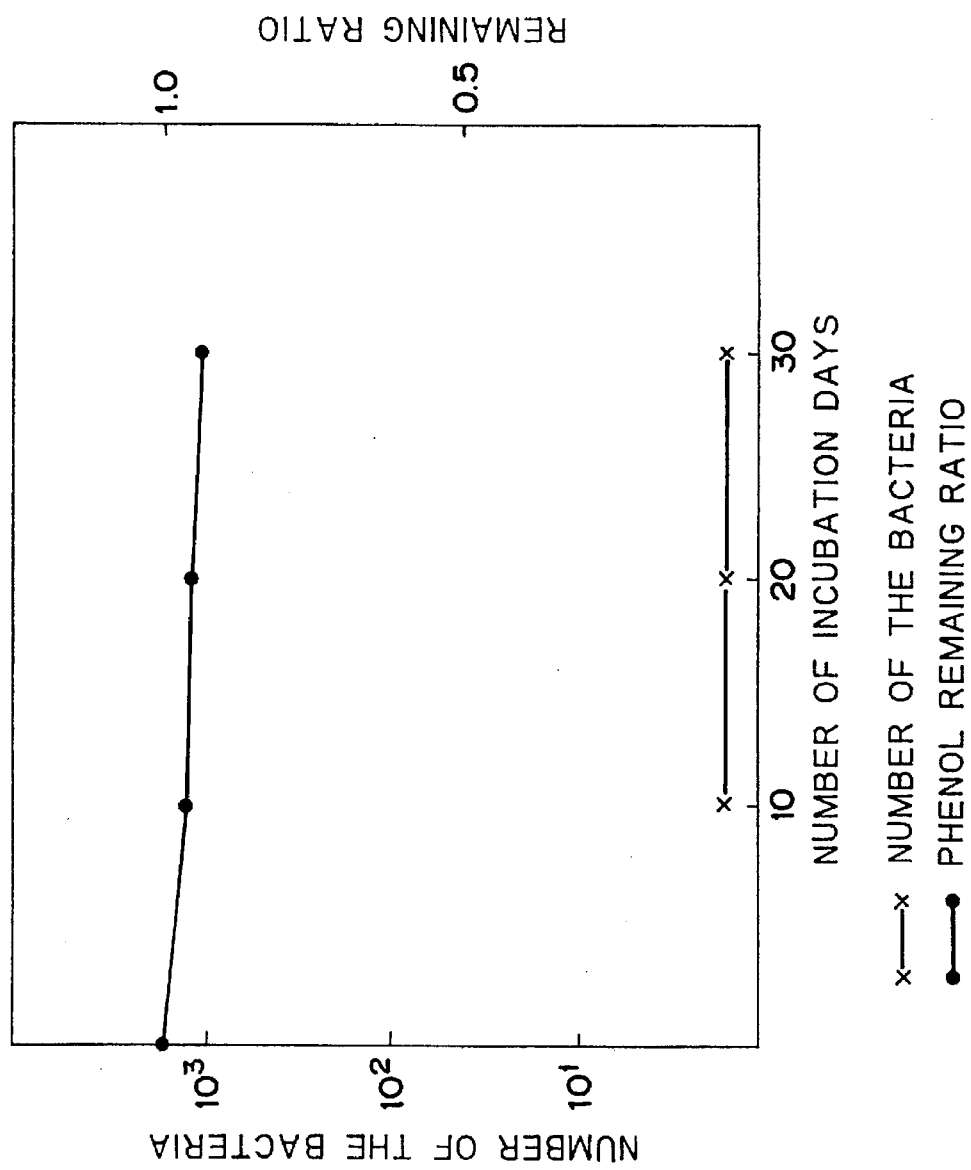
FIG. 10 is a graph showing the results obtained in Example 7.

The leucine-requiring mutant obtained in Example 1 was inoculated on 5 ml of a culture medium (M9 culture medium, additionally containing 0.05% of yeast extract, 20 µg/ml of leucine, and 500 ppm of phenol), and the culture was incubated at 30° C. When the culture came to exhibit the value of O.D. of 0.7, the liquid culture was further incubated in a 500 ml scale until the O.D. value exceeded 0.7. The liquid culture was centrifuged lightly, and the accumulated bacterial mass was dispersed in 500 g of sterilized test soil in which 80 ml of an aqueous 250-ppm phenol solution had been diffused. Thereto filter paper which had been impregnated with an aqueous leucine solution (80 µg/ml) and crushed into pieces of 3 mm or smaller was added in a total amount of about 50 g, and the mixture was blended and incubated by standing at 25° C. for one day. The incubated soil having the microhabitat therein was placed in non-microhabitat-containing sterilized test soil (containing phenol in an amount of 0.5 ppm/g) as shown in FIG. 8, and the entire sol was incubated by standing at 25° C. In FIG. 8, A is a sterilized test soil polluted and containing microhabitat, and B is a sterilized test soil polluted and not containing microhabitat. The change of the number of the bacteria with lapse of time was estimated for both of the microhabitat-containing region and the non-microhabitat-containing region respectively. Similarly the phenol in the soil regions was determined by HPLC to estimate the phenol remaining ratio. The results for the microhabitat-containing soil are shown in FIG. 9, and the results for the non-microhabitat-containing soil are shown in FIG. 10.

Example 8

The leucine-requiring mutant obtained in Example 1 was inoculated on 5 ml of a culture medium (M9 culture medium, additionally containing 0.05% of yeast extract, 20 µg/ml of leucine, and 500 ppm of phenol), and the culture was incubated at 30° C. When the culture came to exhibit the value of O.D. of 0.7, the liquid culture was further incubated in a 500 ml scale until the O.D. value exceeded 0.7. The liquid culture was centrifuged lightly, and the accumulated bacterial mass was dispersed in 500 g of sterilized test soil in which 80 ml of an aqueous 250 ppm phenol solution had been diffused. The test soil was brown forest soil having been picked at forest in Morinosato, Atsugi-Shi, Kanagawa- Ken, Japan. Thereto 3-mm cubic polyurethane pieces were added in a total weight of 50 g, and the mixture was blended and incubated by standing at 25° C. The required leucine was supplied by 50 ml (20 μg/ml) every 24 hours.

Figure 11:
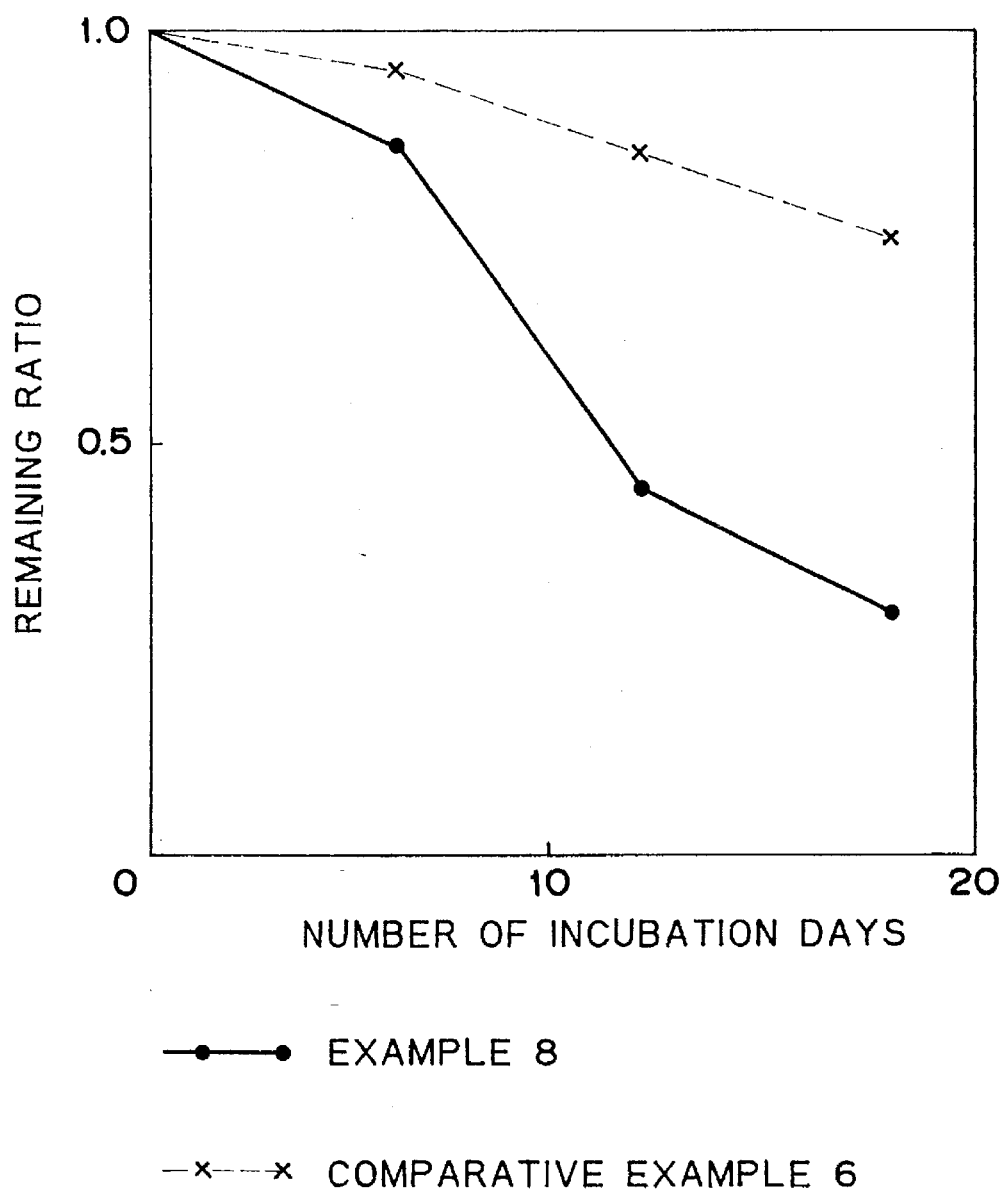
FIG. 11 is a graph showing the results obtained in Example 8 and Comparative Example 6.

The phenol in the soil was determined by HPLC to estimate the change of the remaining ratio. FIG. 11 shows the results.

Comparative Example 6

The remaining ratio of phenol was estimated in the same manner as in Example 8 except that leucine was not supplied to the test soil. FIG. 11 shows the results.

According to the present invention, microorganism works only in a polluted area and the microorganism dies spontaneously after remediation of pollution. Therefore, even when a microorganism is used in an open system. For example in treatment of spillage oil by microorganism on the sea, the present invention enables environment protection without adverse effect caused by the remaining microorganism after the treatment since the employed microorganism dies after treatment.

What is claimed is:

1. A method of biodegradation of a polluting substance in an open ecosystem, comprising the steps of:
    (a) providing a strain selected from the group consisting of auxotrophic mutants of Pseudomonas cepacia KK01, deposited as FERM-4235, possessing the capability of the parent organism for degrading phenol and cresol;
    (b) applying the auxotrophic strain into the ecosystem in the presence of an organic nutrient required by the auxotrophic strain; and
    (c) controlling the growth of the auxotrophic strain in the ecosystem by providing sufficient nutrient to the auxotrophic strain to effect the biodegradation of the polluting substance.

2. The method for biodegradation according to claim 1, including conducting the biodegradation of the polluting substance in an aqueous environment.

3. The method for biodegradation according to claim 1, including conducting the biodegradation of the polluting substance in a soil environment.

4. The method of biodegradation according to any of claims 2, 3, or 7 wherein the Pseudomonas cepacia is supported on a carrier.

5. A method of biodegradation of a polluting substance in an open ecosystem, comprising the steps of:
    (a) providing a strain selected from the group consisting of auxotrophic mutants of Pseudomonas cepacia KK01, deposited as FERM-4235, possessing the capability of the parent organism for degrading phenol and cresol;
    (b) applying the auxotrophic strain into the ecosystem;
    (c) periodically adding sufficient amounts of an organic nutrient required by the auxotrophic strain to stimulate growth of the auxotrophic strain and effect biodegradation of the polluting substance; and
    (d) terminating said addition of nutrient to inhibit the growth of the auxotrophic strain.

6. The method for biodegradation according to claim 5, including conducting the biodegradation of the polluting substance in an aqueous environment.

7. The method for biodegradation according to claim 5, including conducting the biodegradation of the polluting substance in a soil environment.

8. The method of degradation according to any of claims 5-7 including supporting the auxotrophic strain on a carrier.

9. A carrier for remediating a polluted open ecosystem which comprises;
    (a) a synthetic support;
    (b) a strain selected from the group consisting of auxotrophic mutants of pseudomonas cepacia KK01, deposited as FERM-4235, possessing the capability of the parent organism for degrading phenol and cresol, which is attached to said support; and
    (c) a nutrient required for stimulating growth of said auxotrophic strain, said nutrient contained in said support.

10. A method of biodegrading a pollutant comprising a phenolic compound in an open ecosystem comprising the steps of:
    (a) selecting an auxotrophic mutant of a pollutant degradable microorganism capable of degrading the pollutant;
    (b) applying the auxotrophic mutant into the ecosystem;
    (c) providing an organic nutrient which is essential for the auxotrophic mutant to grow, to the auxotrophic mutant in the ecosystem to carry out the biodegradation of the pollutant; and
    (d) terminating supply of said nutrient to cause the auxotrophic mutant in the ecosystem to become exhausted after completing the biodegradation of the pollutant.

11. The method according to claim 10, wherein the nutrient is amino acid.

12. The method according to claim 11, wherein the amino acid is leucine.

13. A method of biodegrading a pollutant in an open ecosystem comprising the steps of:
    (a) providing an auxotrophic mutant strain of Pseudomonas cepacia, the auxotrophic mutant strain being capable of degrading the pollutant;
    (b) applying the auxotrophic mutant strain into the ecosystem;
    (c) providing an organic nutrient which is essential for the auxotrophic mutant strain to grow, to the auxotrophic mutant strain in the ecosystem to carry out the biodegradation of the pollutant; and
    (d) terminating supply of said nutrient to cause the auxotrophic mutant strain in the ecosystem to become exhausted after completing the biodegradation of the pollutant.

14. The method according to claim 13, wherein the organic nutrient is amino acid.

15. A method according to claim 13, wherein the amino acid is leucine.

16. A method for remedying an area polluted with a pollutant comprising a phenolic compound in an environment comprising the steps of:
    (a) selecting an auxotrophic mutant of a pollutant degradable microorganism capable of degrading the pollutant;
    (b) applying the auxotrophic mutant into the environment;
    (c) supplying a nutrient which is essential for the auxotrophic mutant to grow, only into the polluted area to carry out the biodegradation of the pollutant in the area; and (d) terminating supply of said nutrient to cause the auxotrophic mutant in the area to become exhausted after completing the biodegradation of the pollutant in the area.

17. A method according to claim 16, wherein the nutrient is supplied by adding a carrier containing the nutrient.

18. A method according to claim 17, wherein the carrier supports the auxotrophic mutant.

19. A method according to claim 16, wherein the biodegradation of the pollutant is conducted in a liquid.

20. A method according to claim 16, wherein the biodegradation of the pollutant is conducted in a soil.

21. A method according to any one of claims 16–20, wherein the auxotrophic mutant is an auxotrophic *Pseudomonas cepacia*.

22. A method according to claim 21, wherein the auxotrophic mutant is an auxotrophic strain of *Pseudomonas cepacia* KK01, deposited as FERM BP-4235.

23. A method according to claim 16, wherein the nutrient is amino acid.

24. A method according to claim 23, wherein the amino acid is leucine.

* * * * *

UNITED STATES PATENT AND TRADEMARK OFFICE
CERTIFICATE OF CORRECTION

PATENT NO. : 5,658,795

DATED : August 19, 1997

INVENTOR(S): KINYA KATO ET AL.

It is certified that error appears in the above-identified patent and that said Letters Patent is hereby corrected as shown below:

COLUMN 1

Line 19, "are become" should read --have become--.

Line 51, "This method;" should read --This method,--.

COLUMN 2

Line 57, "found" should be deleted.

COLUMN 7

Line 22, "This mutant" should read --¶ This mutant--.

COLUMN 9

Line 1, "20° C" should read --30° C--.

COLUMN 10

Line 43, "sol" should read --soil--.

UNITED STATES PATENT AND TRADEMARK OFFICE
CERTIFICATE OF CORRECTION

PATENT NO. : 5,658,795

DATED : August 19, 1997

INVENTOR(S) : KINYA KATO ET AL.

It is certified that error appears in the above-identified patent and that said Letters Patent is hereby corrected as shown below:

<u>COLUMN 11</u>

Line 18, "system. For" should read --system, for--.

Line 47, "claims 2, 3 or 7" should read
   --claims 1, 2 or 3,--.

Signed and Sealed this

Fourteenth Day of April, 1998

Attest:

Attesting Officer

BRUCE LEHMAN
Commissioner of Patents and Trademarks